United States Patent
Albright

[19]

[11] Patent Number: 5,818,734
[45] Date of Patent: Oct. 6, 1998

[54] METHOD FOR CONTROLLING GREENHOUSE LIGHT

[75] Inventor: Louis D. Albright, Ithaca, N.Y.

[73] Assignee: Cornell Research Foundation, Inc., Ithaca, N.Y.

[21] Appl. No.: 662,343

[22] Filed: Jun. 12, 1996

[51] Int. Cl.[6] .............................. G06F 19/00; A01G 9/14
[52] U.S. Cl. ......................... 364/550; 364/506; 364/420; 47/17; 47/DIG. 6
[58] Field of Search ..................................... 364/483, 550, 364/556, 578, 141, 143, 145, 148, 420, 506; 47/17, 1.01, DIG. 6, 1.01 R, 26, 58; 52/1

[56] References Cited

U.S. PATENT DOCUMENTS

| | | |
|---|---|---|
| Re. 33,600 | 6/1991 | Timmons . |
| 4,396,872 | 8/1983 | Nutter . |
| 4,430,828 | 2/1984 | Oglevee et al. . |
| 4,470,405 | 9/1984 | Landstrom et al. ................... 47/17 X |
| 4,527,247 | 7/1985 | Kaiser et al. ........................... 364/550 |
| 4,569,150 | 2/1986 | Carlson et al. . |
| 4,930,446 | 6/1990 | Huisinga . |
| 4,992,942 | 2/1991 | Bauerle et al. ........................ 364/420 |
| 5,014,225 | 5/1991 | Vidaver et al. ........................ 364/550 |
| 5,031,358 | 7/1991 | Sussman . |
| 5,130,925 | 7/1992 | Janes et al. . |
| 5,269,093 | 12/1993 | Horaguchi et al. ...................... 47/1.01 |
| 5,323,567 | 6/1994 | Nakayama et al. ........................ 47/65 |

OTHER PUBLICATIONS

Ishii et al., "Studies on the Development of Supplemental Lighting Control System for Sunlight in Greenhouse" Shita Journal 5(1), pp. 1–10, 1993.

Primary Examiner—Melanie Kemper
Attorney, Agent, or Firm—Jones, Tullar & Cooper

[57] ABSTRACT

A method for controlling greenhouse light employs first and second algorithms for controlling a supplemental lighting system and a shade control system, respectively, in a greenhouse. The lighting control algorithm controls actuation of electric lamps in the greenhouse based upon a plurality of rules. These rules employ weather and climate data, accumulated and calculated photosynthetic photon flux (PPF) data and off-peak electricity rate hour data to provide uniform daily integrated PPF values in the most cost efficient manner. The shade control algorithm works in conjunction with the lighting control algorithm to insure that the daily PPF values do not exceed a target value on days when the PPF accumulated from solar insolation exceeds the target value. The shade control algorithm operates very precisely to avoid an over shading condition which would require undesirable actuation of the supplemental lighting control system for compensation.

36 Claims, 10 Drawing Sheets

FIG. 5

| Characterizing Parameter | Design PPF, $\mu mol-m^{-2}-s^{-1}$ | | | | |
|---|---|---|---|---|---|
| | 100 | 125 | 150 | 175 | 200 |
| Maximum daily mol-m$^{-2}$ | 41.1 | 41.1 | 41.1 | 41.1 | 41.1 |
| Minimum daily mol-m$^{-2}$ | 8.25 | 9.78 | 11.3 | 12.8 | 14.4 |
| mol-m$^{-2}$-year$^{-1}$ in excess of daily target | 1613 | 1615 | 1612 | 1608 | 1603 |
| mol-m$^{-2}$-year$^{-1}$ below daily target | 557 | 329 | 165 | 82 | 54 |
| mol-m$^{-2}$-year$^{-1}$ net excess | 1056 | 1286 | 1447 | 1526 | 1549 |
| mol-m$^{-2}$-year$^{-1}$ unnecessary lighting | 62 | 63 | 45 | 12 | 7 |
| Hours per year of unnecessary lighting | 173 | 139 | 84 | 19 | 10 |
| kWh-m$^{-2}$-year$^{-1}$ (elect. input) unnecessary lighting | 28.3 | 28.4 | 20.5 | 5.3 | 3.4 |

FIG. 7

| Data Set | Rule 1 | Rule 2 |
|---|---|---|
| New Jersey | 1009 | 583 |
| Ithaca 1983 | 955 | 610 |
| Ithaca 1984 | 869 | 563 |
| Ithaca 1985 | 893 | 603 |
| Ithaca 1986 | 859 | 539 |
| Ithaca 1987 | 924 | 595 |
| Ithaca 1988 | 953 | 592 |
| Ithaca 1989 | 854 | 558 |
| Ithaca 1990 | 830 | 580 |
| Ithaca 1991 | 975 | 599 |
| Ithaca: Average | 901 | 582 |

|  | Lights, No Shade | | | Lights and Movable Shade | | | |
|---|---|---|---|---|---|---|---|
| Mo. | Ave. Solar mol-m$^{-2}$ | Ave. Added mol-m$^{-2}$ | Ave. Daily mol-m$^{-2}$ | Lighting kWh-m$^{-2}$ per month | Ave. Solar mol-m$^{-2}$ | Ave. Added mol-m$^{-2}$ | Ave. Daily mol-m$^{-2}$ | Lighting kWh-m$^{-2}$ per month |
| Jan | 6.3 | 10.7 | 17.0 | 151 | 6.3 | 10.7 | 17.0 | 151 |
| Feb | 9.6 | 7.8 | 17.3 | 99 | 9.4 | 7.8 | 17.1 | 99 |
| Mar | 15.7 | 2.9 | 18.6 | 41 | 13.7 | 3.0 | 16.7 | 42 |
| Apr | 16.4 | 3.6 | 19.9 | 49 | 13.0 | 3.7 | 16.7 | 51 |
| May | 24.7 | 1.8 | 26.5 | 25 | 15.5 | 2.0 | 17.5 | 28 |
| Jun | 30.2 | 0.7 | 30.9 | 10 | 16.9 | 0.9 | 17.8 | 13 |
| Jul | 27.5 | 0.9 | 28.5 | 13 | 16.7 | 1.1 | 17.8 | 15 |
| Aug | 24.1 | 1.0 | 25.1 | 14 | 16.3 | 1.1 | 17.4 | 15 |
| Sep | 17.0 | 2.8 | 19.8 | 38 | 13.9 | 2.9 | 16.7 | 39 |
| Oct | 9.4 | 7.7 | 17.1 | 109 | 9.3 | 7.8 | 17.0 | 109 |
| Nov | 5.7 | 11.2 | 16.9 | 152 | 5.7 | 11.2 | 16.9 | 152 |
| Dec | 4.9 | 12.1 | 17.0 | 170 | 4.9 | 12.1 | 17.0 | 170 |
| Ave. | 16.0 | 5.2 | 21.2 |  | 11.8 | 5.3 | 17.1 |  |
| Yrly Sum | 5836 | 1919 | 7755 | 871 | 4307 | 1949 | 6256 | 884 |

FIG. 6

METHOD FOR CONTROLLING GREENHOUSE LIGHT

BACKGROUND OF THE INVENTION

The present invention relates in general to a rule based method for controlling greenhouse light through selective actuation of supplemental lighting and movable shade systems.

Studies of plant and vegetable growth have established that the daily amount of photosynthetic photon flux (PPF) to which the plants or vegetables are exposed, is by far the most important attribute of the light environment to consider for consistent timing of crops. For example, hydroponic lettuce in commercial production remains entirely vegetative and is sold prior to its reproductive stage; thus the lighting day may be as long as 24 hours. A consistent daily PPF integral (plus excellent environmental control and horticultural practices, of course) has permitted a very high degree of crop uniformity. Hydroponic lettuce is grown to market size (150 g, 5 oz.) in 35 days from seed every day of the year. A daily target of 17 mol·m$^{-2}$ of PPF has been identified as the upper limit to prevent onset of lettuce tip burn on the cultivar Ostinata, provided air recirculation is continuous within the greenhouse and is directed down into the canopy to encourage transpiration near the growing points, with concomitant calcium uptake to the growing tips of the new leaves.

Other research indicates that vegetative plant growth in greenhouses is nearly proportional to the daily solar PPF integral. PPF saturation is, of course, a possibility, but occurs less inside greenhouses than outdoors. Greenhouse structures block a significant portion of solar insolation, up to half in older structures having complex framing. The shading effect of greenhouses has permitted plant growth modelers to assume that daily PPF integrals are the critical parameter in describing crop response to light. Thus, the daily PPF integral can be used to produce excellent timing and uniformity if other environmental factors and horticultural practices are carefully controlled.

Unfortunately, in the Northeastern United States, as in many other temperate locations worldwide, winter solar insolation falls far short of the daily PPF integrals needed for consistent crop production within greenhouses. For example, daily averaged integrals lower than 10 mol·m$^{-2}$ are common in New York State from November through February. As a result, supplemental lighting is required, however, several factors in the design and control of supplemental lighting systems are not well quantified. One is the PPF intensity for which a lighting system should be designed to achieve a desired daily integral in a specific geographic location. Another is the interaction of off-peak electric light schedules with lighting control, and the resulting cost of the lighting. A third and very important one, is an algorithm for control that will achieve the daily PPF integral every (or at least almost every) day of the year if the lighting capacity is sufficient, and yet not use the luminaires excessively.

Another method for providing a consistent light environment for crops cultivated in greenhouses is to employ movable shade systems. These systems are useful in geographic locations and/or during times of the year when the daily integrated PPF from the sun exceeds the desired level on some days, while on other days, is substantially less than the desired level. For example, even during summer in some parts of the United States there are days with as little light integrated during the day as during an average day in the middle of winter. Only a movable shade system, if properly controlled, can adjust to widely varying conditions and permit the entry of as much light as possible on cloudy days, while excluding excess light on sunny days.

Although a number of studies have been conducted which provide an understanding of how greenhouse shades can be effective, little has been published on controlling movable shade systems in commercial greenhouses. Shade systems are traditionally used to limit the solar cooling load in greenhouses to prevent water stress on the plants, or to avoid excessive air temperature increases above outdoors, or primarily for worker comfort. Early shade systems were deployed based on the decision of the greenhouse grower. Today, computerized control of shade systems is common, and these work typically by deploying a shade or shades once the PPF intensity reaches a predetermined level. However, the control strategies employed with these systems are too simplistic to provide precise enough PPF control that a target integral can be reached every day.

In view of the foregoing, a greenhouse lighting control method is clearly needed which can precisely control the integrated PPF in the greenhouse so that a target level can be achieved each day, thereby facilitating superior plant quality and quantity, as well as consistent crop timing.

SUMMARY OF THE INVENTION

To satisfy the foregoing need, the present invention provides a method for controlling greenhouse light which employs a first algorithm for control of a supplemental lighting system, and a second algorithm for control of a shading system.

For the supplemental lighting control algorithm, a set of rules is implemented by which the lighting can be controlled to achieve, consistently, a user-specified daily target of integrated PPF. The algorithm is specifically designed so that off-peak electricity, where available, is used as much as possible to supply power to the lighting, and control of the lighting does not result in frequent changes between on and off states during any single day. The algorithm does not rely on weather data or daily weather forecasts, and insures that natural light will be used to the maximum extent possible in achieving the daily PPF integral.

To achieve the foregoing goals, the supplemental lighting algorithm employs a plurality of IF/ELSE statements, one for each rule of the algorithm. Each rule is structured to turn off the lights if the corresponding Boolean test is true. The various rules control operation of the lights in accordance with a number of factors including the time of year, the time of day and the daily accumulated PPF. For example, the lights are not permitted to operate early in the morning during the brighter months of the year since it is anticipated that adequate insolation will be provided by the sun. Other rules insure that as much of the required supplemental lighting as possible will be delayed to off-peak hours to reduce energy costs.

The shade control algorithm is designed to work in conjunction with the supplemental lighting control algorithm to insure that the total daily integrated PPF remains consistent throughout the year, even on days when insolation from the sun will exceed the desired target level. It is very important that the shade control algorithm be precise in its control of the shades and not require the use of supplemental lights to compensate for excess shading. The shade control algorithm is also rule based, but only employs one or two rules to determine if the shade should be deployed. Both of these rules sum the integrated PPF from all sources and the idealized integrated solar PPF projected for the remainder of the day, and determine if the resulting sum exceeds the PPF daily target which triggers the deployment of the shades if it does. The most critical of the two rules estimates the idealized integrated PPF for the remainder of the day by measuring the PPF averaged over the previous hour to calculate a corresponding value of $PPF_{max}$, the maximum daily value of PPF. $PPF_{max}$ is then employed in an equation to calculate the idealized integrated PPF for the remainder of the day. The second rule differs from the first in that it uses the integral of solar PPF since sunrise to calculate the value of $PPF_{max}$ that would have produced the same integral to the current hour.

BRIEF DESCRIPTION OF THE DRAWINGS

The features and advantages of the present invention will become apparent from the following detailed description of a preferred embodiment thereof, taken in conjunction with the accompanying drawings, in which:

FIG. 5 is a table illustrating integrated PPF data for five lighting system designs that were employed to test the lighting control algorithm;

FIG. 6 is a table illustrating the performance characteristics of the shade control algorithm as tested using 1988 Ithaca, New York weather data and comparing the daily integrated PPF values obtained using only supplemental lighting with those obtained using supplemental lighting and a movable shade system; and FIG. 7 is a table illustrating the frequency with which each of the two rules of the shade control algorithm were triggered for each of a number of years of weather data.

DETAILED DESCRIPTION OF THE PREFERRED EMBODIMENT

Figure 1:
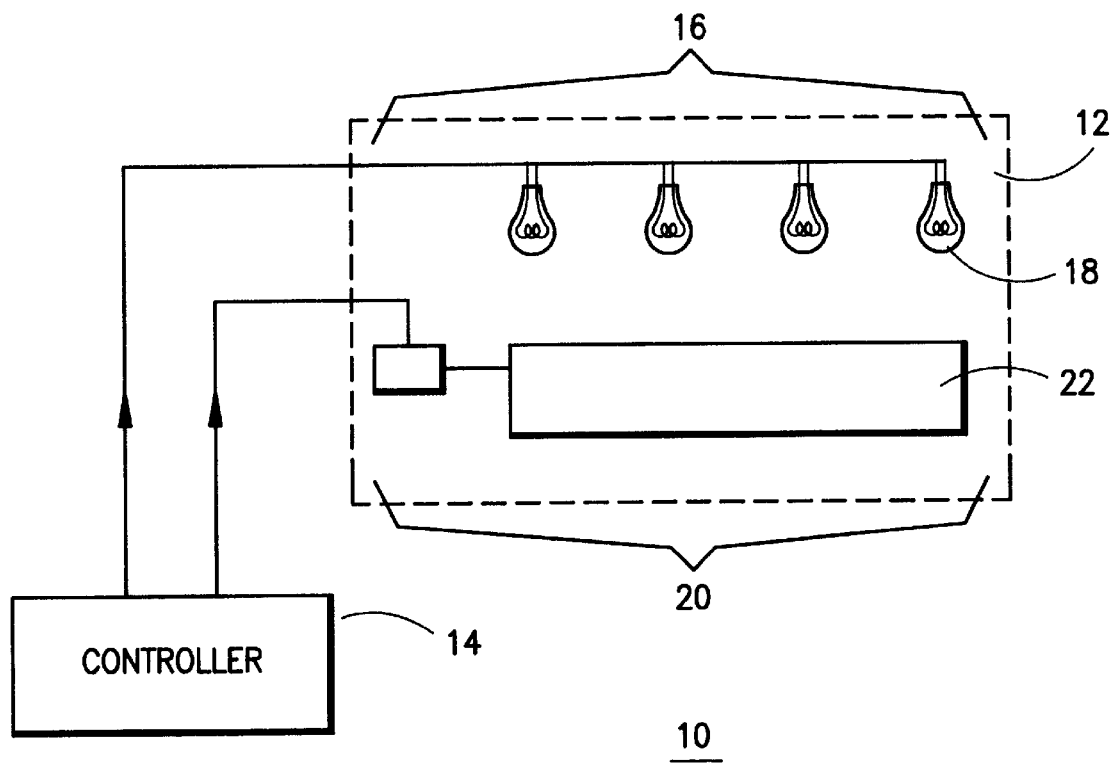
FIG. 1 is a schematic illustration of a greenhouse light control system which employs the supplemental lighting control and shade control algorithms of the present invention.

Referring to FIG. 1, the method of the present invention is employed in a greenhouse light control system 10 which controls the daily PPF to which the interior of a greenhouse 12 is exposed. The system 10 includes a microprocessor based controller 14 which controls actuation of a supplemental lighting system 16 comprised of a plurality of electric luminaires or lamps 18, and a movable shade control system 20 comprised of one or more movable shades 22.

To achieve a desired PPF target level for each day, the lamps 18 are actuated on days when the total PPF accumulated from solar insolation falls below, or is projected to fall below, the target PPF level, while the shades 22 are deployed (closed) on days when the total solar PPF exceeds, or is projected to exceed, the target PPF level. Ideally, to provide the most efficient energy utilization, the lamps 18 should never be actuated to compensate for excessive shading from the shades 22. Further, as much as possible of the required lamp actuation should occur during off-peak electricity rate hours to reduce electricity cost. To achieve this goal, the controller 14 is programmed in accordance with the method of the present invention with both a supplemental lighting control algorithm and a shade control algorithm. These determine, from various measurements and calculations, when the lamps 18 should be turned on or off, and when the shades 22 should be deployed, to insure that the plants or vegetables grown in the greenhouse 12 are exposed to uniform amounts of PPF each day of the year, regardless of the time of the year or the weather.

Supplemental Lighting Control Algorithm

A first goal in developing the supplemental lighting control algorithm was to achieve suitable control without considering historical weather data or daily weather forecasts. In a practical sense, it is difficult for greenhouse installation contractors or growers, for example, to obtain historical weather data. Further, average historical conditions may poorly represent any given day of weather. For example, in Ithaca, N.Y. the average daily solar PPF integral (outdoors) during July is approximately 42 mol-m$^{-2}$. Yet, there are occasional July days with barely 4 mol-m$^{-2}$ and others near 60. Control based on the average for every day will be clearly inadequate; history would suggest a shade by deployed every day if the daily target is 17 mol-m$^{-2}$. Requiring a weather forecast for the coming day is also problematic for, although on-line weather forecasts may be imported to control programs, access is not yet universal and adds a level of complexity that is unnecessary if other adequate, but simpler, control strategies can be identified.

A second goal in developing the supplemental lighting control algorithm was to avoid need of adaptive control, or program "learning". Such alternative control strategies could be equally valid, but were assumed to be possibly required only for a secondary level of control—to refine the values of parameters contained within the primary algorithm.

A fundamental assumption in developing the supplemental lighting control algorithm is as follows. The function of the lighting control is to turn lamps 18 off, not on. Control is active when the lamps 18 are off. The control algorithm assumes that the lamps 18 are on (each hour) and searches for reasons to switch them off. This approach proved to be more successful than the opposite—searching for reasons to switch the lamps 18 on—but it is not necessary for implementing the method of the present invention.

Figure 2:
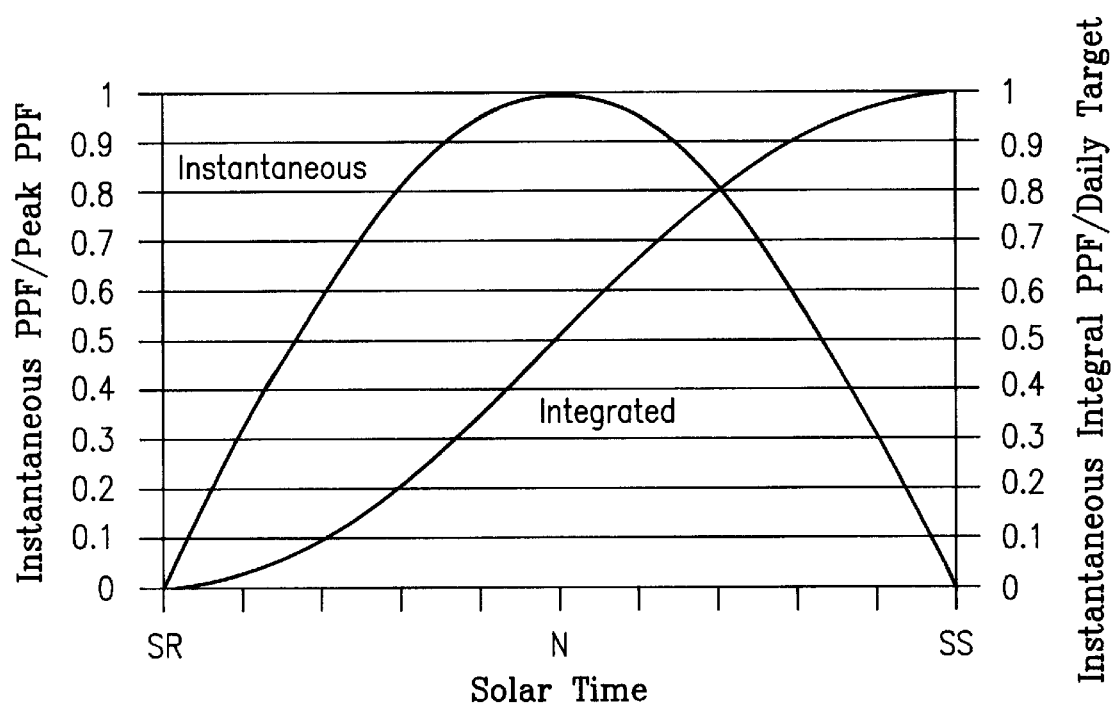
FIG. 2 is a graph illustrating the idealized history of daily (normalized) solar PPF, and its integral, showing the instantaneous and integrated PPF as a function of solar time from sunrise to sunset.

A second fundamental assumption in developing the algorithm is based on idealizing daily PPF input. The daily PPF history will follow a sine curve in a perfect situation as illustrated in FIG. 2, starting at sunrise and ending at sunset (ignoring contributions of twilight to photosynthesis). In this idealized situation, instantaneous PPFt can be calculated from $$PPF_t = PPF_{max} \sin\left(\frac{\pi(t - SR)}{(SS - SR)}\right). \tag{1}$$

where, $PPF_{max}$ is the maximum instantaneous PPF value achieved during the day, SR is the hour (decimal) of sunrise and SS is the hour (decimal) of sunset. The idealized daily PPF integral to time t is obtained by integrating Equation 1, to yield $$PPF_{integral} = \qquad (2)$$

$$0.0036 \, PPF_{max} \left[ \frac{(SS - SR)}{\pi} \right] \left[ 1 - \cos\left( \pi \frac{(t - SR)}{(SS - SR)} \right) \right],$$

where the factor of 0.0036 converts $\mu$mol-s$^{-1}$ to mol-hr$^{-1}$. Equations 1 and 2 are graphed in FIG. 2. If light intensity is modulated to equal the desired target precisely by sunset, $PPF_{integral} = PPF_{target}$ for t=SS. Equation 2 can be inverted to solve for $PPF_{max}$ as a function of $PPF_{integral}$ and, thereby, $PPF_{target}$. Equation 2 can thus be rewritten to express the idealized PPF integral to time t in terms of the daily target.

$$PPF_{integral} = 0.5 \, PPF_{target} \left[ 1 - \cos\left( \pi \frac{(t - SR)}{(SS - SR)} \right) \right] \qquad (3)$$

Equation 3 provides a means to establish a moving benchmark of accumulating PPF during a day, sensitive to the sunrise and sunset hours and the daily PPF integral target.

Note that, implicit in the development of what follows, each lighting "day", for control purposes, is assumed to begin at sunrise and end at the following sunrise. This leads to occasional days having fewer or more than 24 hours for PPF accumulation purposes, but was found not to lead to problems. Sunrise is calculated for each day from solar geometry equations and truncated to an integer value. Sunset is calculated as the equivalent number of hours before midnight. Solar time is used as the basis for the computer program.

The algorithm for lighting control was developed and tested using a greenhouse simulator program in which the algorithm could be included. Weather data typically includes insolation for the previous hour, which the program converts to PPF units.

The structure to search for reasons to turn off lights is the IF/ELSE IF/ELSE IF . . . construct, rather than a series of IF statements. Each rule is structured to turn off lights if the corresponding Boolean test is true. The sequence of rules follows. The daily PPF accumulation is updated (a running sum) hourly, for only at each hour were weather data available to determine the PPF accumulated from the sun. Admittedly, some of the tests listed below appear occasionally to overlap, but repeated variations of the tests suggested such overlap is useful to address the wide variety of insolation conditions that can occur during a year. During development of the algorithm, many rules were tested. The ones below are what remain after detailed examinations of how the rules responded to one year of available weather data, 1988 data for Ithaca, N.Y.

The flow chart for the supplemental lighting control algorithm is illustrated in FIGS. 3A–3E. The following tests occurred hourly although a time step of this length is not required for a control program. On the other hand, very short time steps are not likely to be needed or, perhaps, even desirable. Thus, the algorithm is delayed until the start of the desired time interval as illustrated at step 100 in FIG. 3A. Eight rules follow, preceded by the following preliminary calculations.

One preliminary calculation is made only when the control program begins at step 102:
  a. The integrated supplemental PPF achievable by operating lights during the entire off-peak period (less a possible dark period for photoperiod control) is calculated. This assumes time-of-day electricity rates remain the same for the year.

A secondary preliminary calculation (step 104) is made at 1 am of each day:
  b. Calculate the sunrise and sunset hours for the day of the year, based on the latitude and longitude of the greenhouse location.

A third preliminary calculation is made for each hour of the weather data set:
  c. The total (potential) PPF that could be accumulated using only supplemental lighting if lamps were to be activated at the beginning of the next hour and remain on until the following sunrise hour or end of the off-peak period (and possibly de-activated for a dark period for photoperiod control), whichever comes first.

Other preliminary calculations made during step 104 include calculation of off-peak rate hours and the idealized daily PPF target value.

Once all of the preliminary calculations are made, the algorithm advances to step 106 which inquires whether sunrise will occur during the current time interval. If so, the algorithm proceeds to step 108 and calculates the target PPF integral for every time interval until the next sunrise. Next, at step 110, the accumulated PPF for the next time interval is determined. From this value, the PPF accumulated since sunrise and the amount of PPF remaining to be accumulated for the day to meet the target PPF value are calculated at step 112.

The algorithm is now ready to proceed with testing of each of the eight rules. As discussed previously, the rules operate on the assumption that the lamps 18 are actuated as indicated at 114, and look for reasons to turn them off. The algorithm first proceeds at step 116 to Rule 1 which is described below.

Rule 1. If time clock control is included and the current hour is during the period when lamps should be off (step 118), control is activated and the lamps are turned off at step 120. The program then returns to start the next light loop at step 122.

Once Rule 1 is completed, the algorithm proceeds to Rule 2 at step 124. The operational principles of Rule 2 are as follows:

Rule 2. Do not permit lights to operate early in the morning during the brighter months of the year; anticipate adequate insolation until sufficient data has been accumulated to show a high probability the day will be dark. In the program, keyed to conditions of the northeastern U.S., the specific tests were:
  a. For months of greatest solar irradiation, turn lamps off between sunrise and H1 hours after sunrise. However, if the daily accumulated PPF is not equal to at least one-quarter of the daily target by solar noon, permit lights to be on regardless of the value of H1.
  b. For late summer (when days are still sunny, but solar intensity has lessened), turn off lamps between sunrise and H2 hours after sunrise. However, if the daily accumulated PPF is not equal to at least one-quarter of the daily target by solar noon, permit lights to be on regardless of the value of H2.
  c. For spring and autumn months, turn lamps off between sunrise and H3 hours after sunrise.
  d. For the rest of the months of the year, turn lamps off between sunrise and H4 hours after sunrise.
  Justification: During months with greater solar irradiation, avoid adding supplemental light during cloudy morning hours; anticipate more insolation will become available later in the day. This expectation is viable for fewer hours during late summer and early autumn, and even fewer during winter months (H1>H2>H3>H4).

To implement Rule 2, the algorithm proceeds to step 126 and inquires whether the current day is during the time of year with solar insolation greater than or equal to a predetermined value. If so, the algorithm proceeds to step 128 and sets the lighting start delay interval appropriate to the climate and month of the year. Next, at step 130, the algorithm determines if the current time is within the delay interval. If so, the decision is made to turn the lamps 18 off at step 132, and the algorithm proceeds directly to Rule 8 at step 134. If the current time is not within the delay interval, the algorithm proceeds to Rule 3 at step 136 which is described next.

Rule 3. If PPF accumulated to this hour from the sun meets or exceeds the accumulation target (Equation 3) for the hour, turn the lamps off.

Justification: To this hour, there is no PPF deficit.

To implement Rule 3, the algorithm proceeds to step 138 to determine if the accumulated PPF is greater than the accumulation target at the current time interval. If so, the algorithm makes the decision to turn the lights off at step 132, and then proceeds to Rule 8 at step 134. If not, the algorithm proceeds to Rule 4 at step 140, the operational principles of which are described below.

Rule 4. If: (a) the hour is during the time of year with more sunlight and between sunrise and sunset, (b) the PPF left to be accumulated could be achieved by turning on the lamps at the next hour even if the solar PPF drops suddenly to insignificance, and (c) the shortage of PPF to this point could be made up by a scaled portion of the off-peak PPF potential, turn the lamps off. The off-peak PPF potential is scaled so decisions during the early hours of the solar day are not based on an expectation of using all the off-peak PPF potential to make up for the current deficit, saving nothing to compensate for hours of low solar insolation occurring later in the day. The scaling function used in the program was a multiplying sine function that rose from a zero value at sunrise to unity at sunset. (A linear rise may have done as well.)

Justification: This pushes as much supplemental lighting as possible into the off-peak electric rate hours and is particularly sensitive to this need during the months of the year having higher solar PPF expectations.

To implement Rule 4, the algorithm starts at step 142 to inquire whether the current time interval is during the sunnier time of the year (times with average daily solar insolation greater than or equal to the predetermined value). If so, the algorithm proceeds to step 144 to determine whether the current time is between sunrise and sunset. If it is, the algorithm proceeds to step 146 (see FIG. 3C) to inquire whether the remaining PPF for the day could be accumulated using only supplemental lights starting at the next time interval. If the answer to this inquiry is affirmative, the algorithm proceeds to step 148 to inquire whether any shortage of PPF at this time can be made up by a scaled portion of the off-peak supplemental PPF. If so, the decision is made to turn the lights off at step 150, and the algorithm proceeds to Rule 8 at step 152. If any of the answers to the inquiries in steps 142, 144, 146 and 148 are no, the algorithm proceeds to Rule 5 at step 154 whose operational principles are described next.

Rule 5. Turn the lamps off if the hour is between sunrise and sunset and the PPF left to be accumulated could be accumulated by turning on the lamps at the next hour even if the solar PPF drops immediately to insignificance and remains there for the rest of the day.

Justification: Somewhat an echo of Rule 4 above, but applies to all months.

To implement Rule 5, the algorithm inquires whether the current time is between sunrise and sunset at step 156, and if it is, it goes to step 158 and inquires whether the remaining required PPF for the day could be accumulated using only supplemental lights starting at the next time interval. If so, the decision is made to turn the lights off at step 160, and the algorithm proceeds to Rule 8. If either of the answers to the inquiries at steps 156 and 158 are no, the algorithm proceeds at step 164 to Rule 6 whose operational principles are described next.

Rule 6. If: (a) the hour is at sunset or between sunset and an hour before the start of off-peak electric rates and (b) the accumulated PPF deficiency to this hour could be made up by off-peak hours alone, turn off the lamps.

Justification: Use off-peak electric rates as much as possible.

Figure 3A:
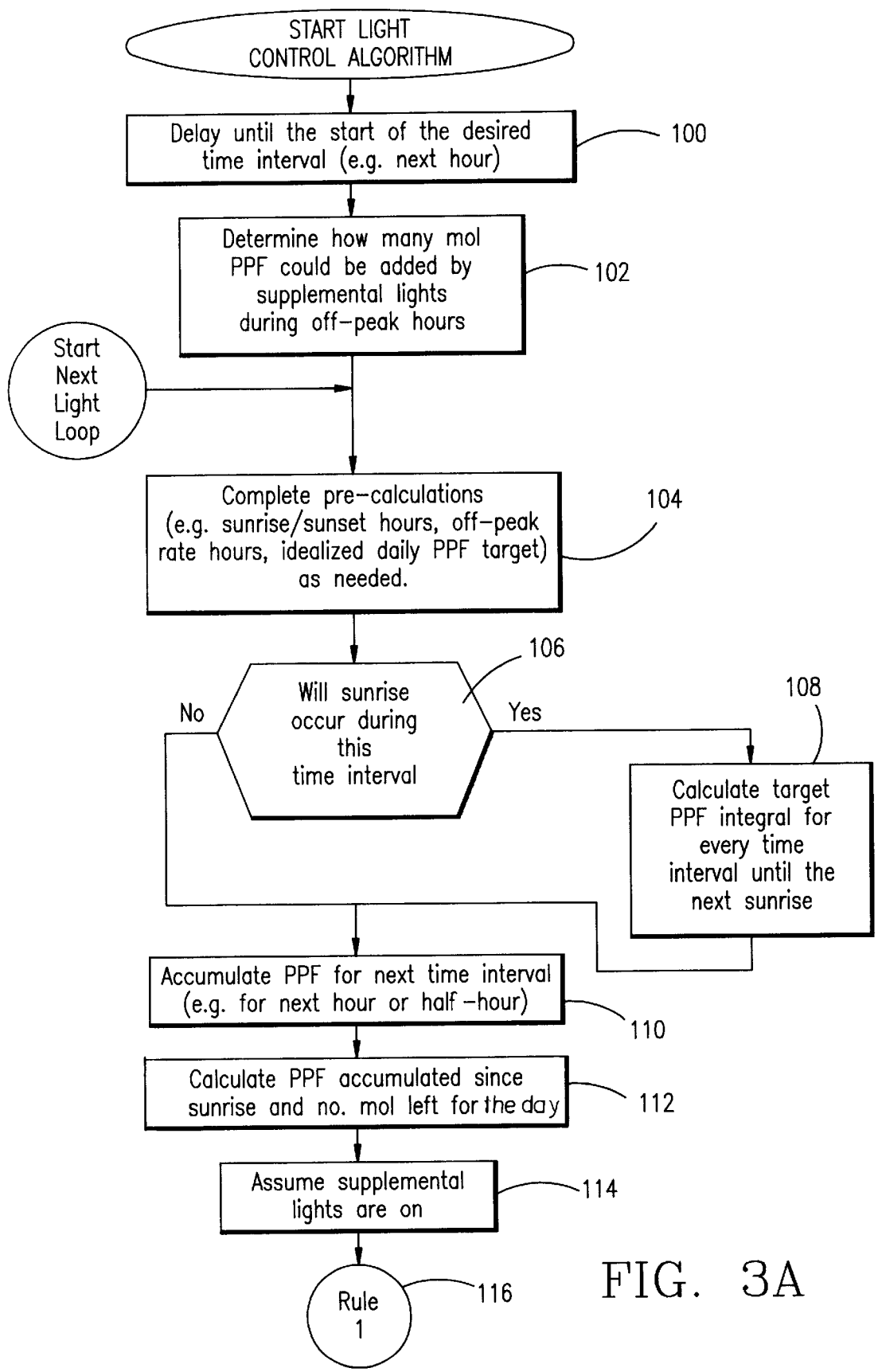
FIGS. 3A–3E depict a flow chart illustrating the steps of a supplemental lighting control algorithm employed in the method of the present invention.
Figure 3B:
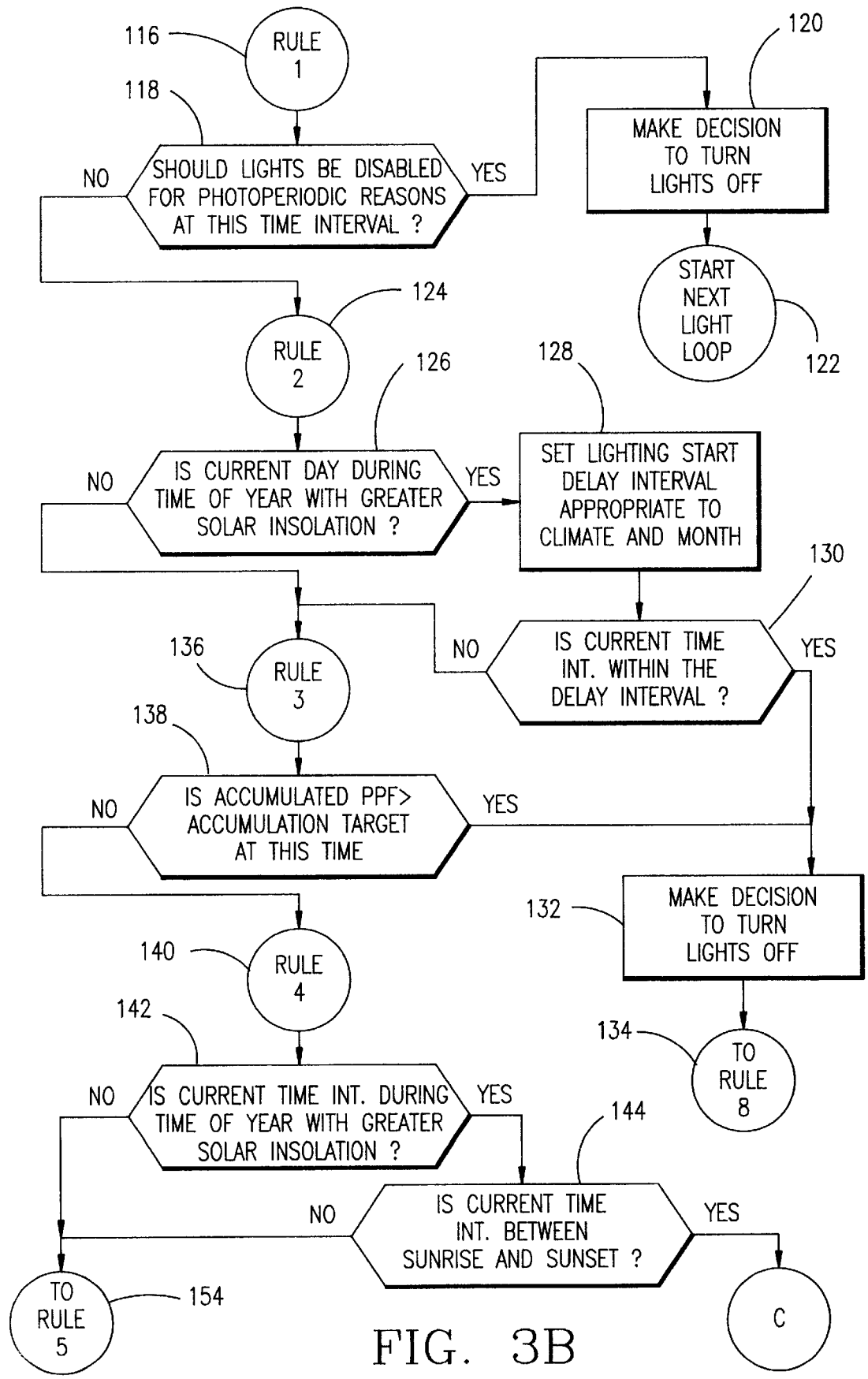
Figure 3C:
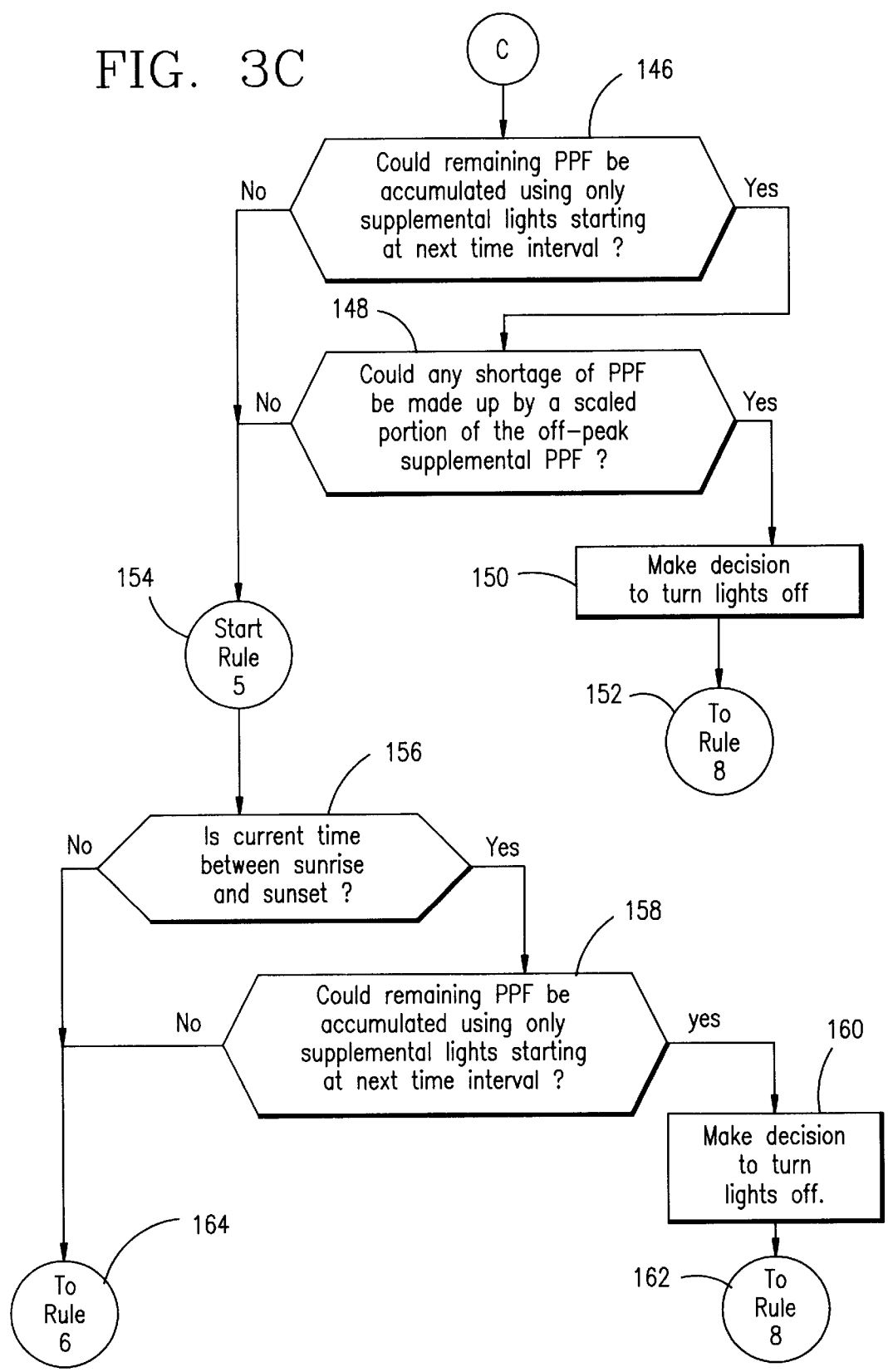
Figure 3D:
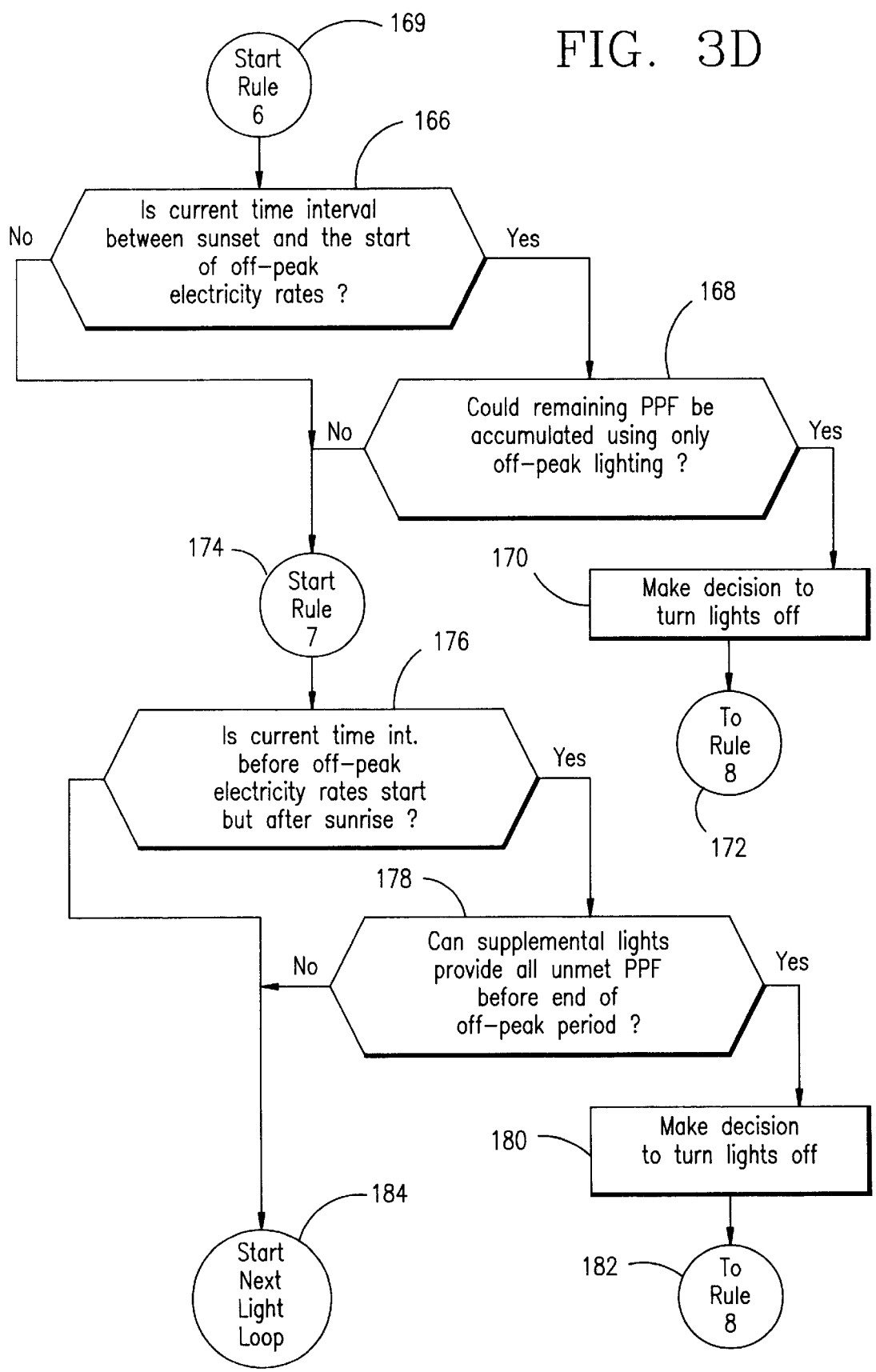

Referencing FIG. 3D, Rule 6 is implemented by first inquiring at step 166 if the current time is between sunset and the start of off-peak electricity rates. If so, the algorithm proceeds to step 168 and inquires whether the remaining PPF required for the day could be accumulated using only off-peak lighting. If so, the decision is made to turn the lights off at step 170, and the algorithm proceeds to Rule 8 at step 172. If either of the answers to the inquiries at steps 166 and 168 are no, the algorithm proceeds at step 174 to Rule 7 whose operational principles are described next.

Rule 7. If the hour is before off-peak electric rates start, but any remaining PPF to be added by supplemental lighting will be achieved before the off-peak period ends, keep the lamps off.

Justification: Push as much of the supplemental lighting as possible into the off-peak hours.

To implement Rule 7, the algorithm inquires at step 176 whether the current time is before off-peak electricity rates start but after sunrise. If so, the algorithm proceeds to step 178 and inquires whether the supplemental lighting system 16 can provide all unmet PPF for the day before the end of the off-peak period. If so, the decision is made at step 180 to turn the lights off, and the algorithm proceeds to Rule 8 at step 182. If the answers to either of the inquiries at steps 176 and 178 are no, the algorithm goes to step 184 to start the next light loop, and returns to the beginning of the algorithm at step 104.

As a final test, after the above conditions are considered, a safety check is imposed based on a separate IF statement that is not part of the IF/ELSE IF statements described above.

Rule 8. Be sure lamps are not turned off if the hour is during the dark part of the year and there remains more integrated PPF to be added than can be met by the lamps, alone, operating from the next hour until the following sunrise or mandatory dark period for photoperiodic considerations.

Justification: Avoid a combination of conditions whereby the daily PPF integral is not met, there is little expectation of substantial solar PPF accumulation for the rest of the day, and the lamps remain off during for the next hour.

Figure 3E:
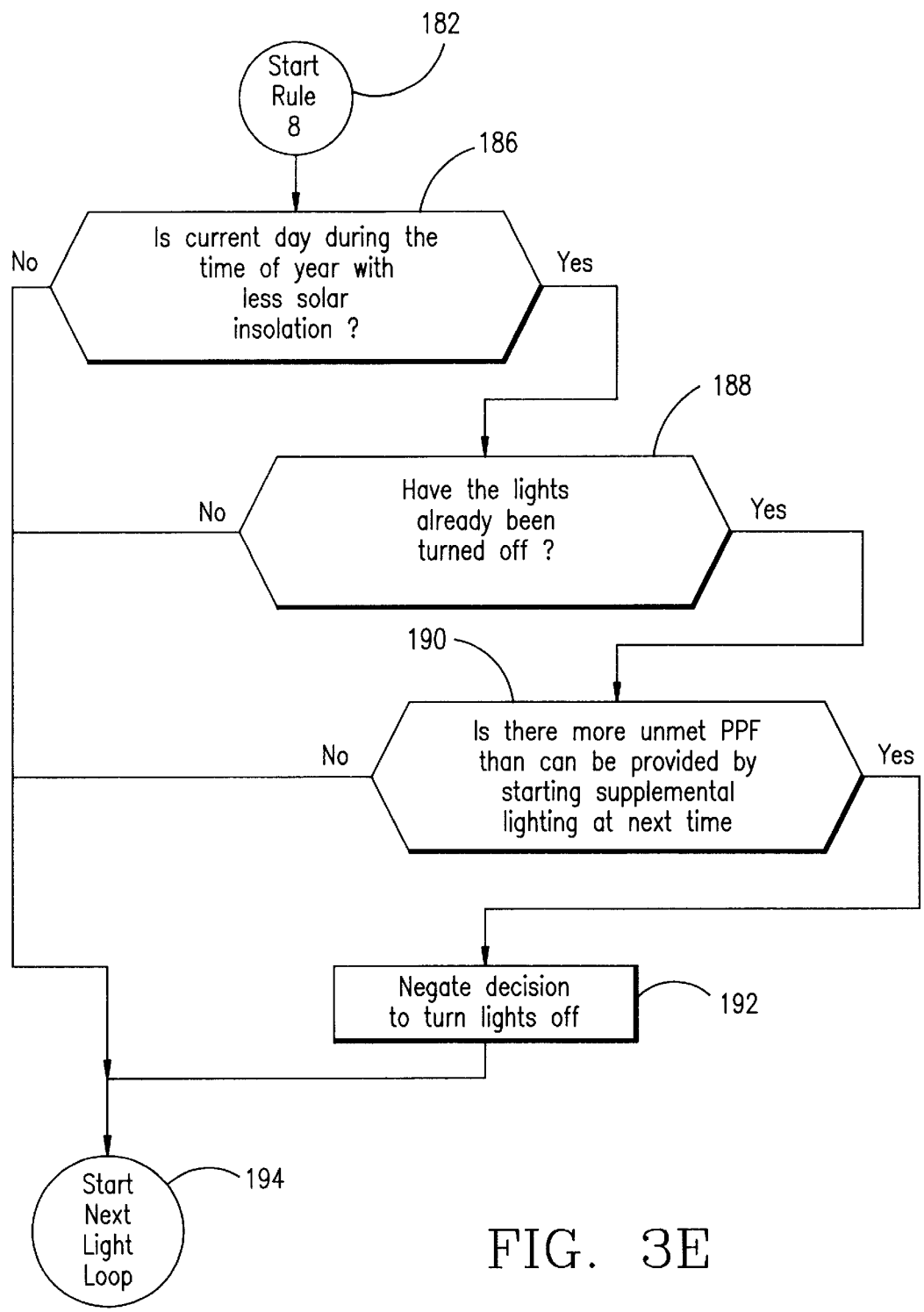

To implement Rule 8, as illustrated in FIG. 3E, the algorithm inquires at a step 186 if the current day is during the darker times (times when the average daily solar insolation is below the predetermined level) of the year. If so, the algorithm proceeds to step 188 to determine if the lamps 18 have already been turned off. If they have, one more inquiry is made at step 190 to determine if there is more unmet PPF than can be provided by starting supplemental lighting at the next time step. If so, the decision to turn the lights off is negated at step 192 and the next light loop is started at step 194. This step is also implemented if the answer to any of the inquiries in steps 186, 188 or 190 is no, and the algorithm returns to the beginning at step 104.

Shade Control Algorithm

A similar philosophy was used to develop the algorithm for movable shade control. However, it was found suitable to assume, each hour, that the movable shade 22 is retracted or open. The algorithm searches for reasons to deploy (close) the shade 22.

Figure 4:
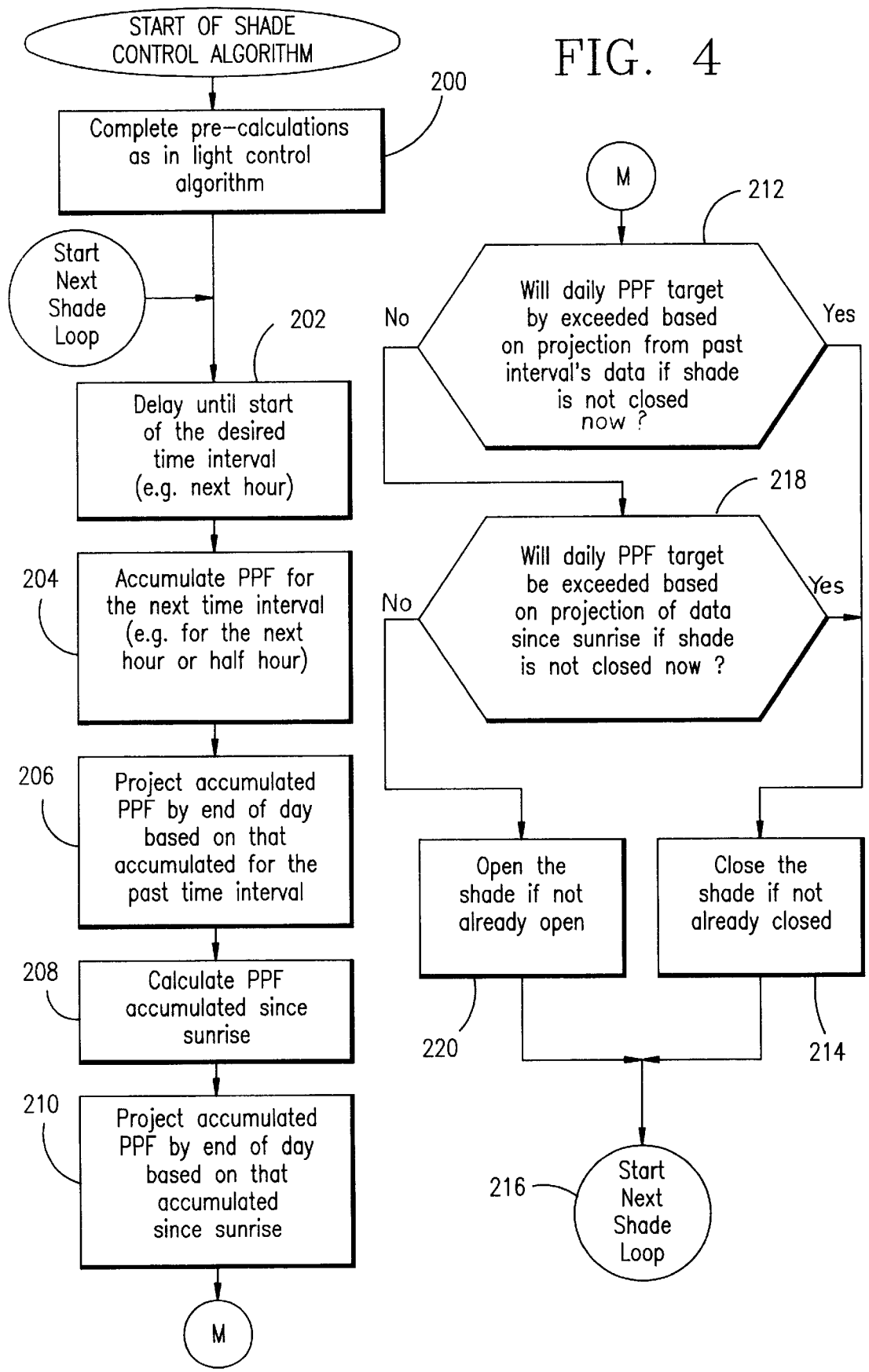
FIG. 4 is a flow chart illustrating the steps of a shade control algorithm employed in the method of the present invention.

FIG. 4 illustrates the steps of the shade control algorithm. First, at step 200, a calculation of sunrise and sunset hours for each day, done at midnight, precedes application of shade control rules. This calculation is done in conjunction with the supplemental lighting control algorithm. The algorithm then waits at step 202 until the start of the next time interval. The following two rules are then imposed, hourly.

1. Starting two hours after sunrise, and continuing until one hour before sunset, use the measured PPF averaged over only the previous hour to calculate the corresponding value of $PPF_{max}$, based on Equation 1. (Measure the hourly PPF within the greenhouse, but not under the shade, if the shade is already deployed.) Use the calculated value of $PPF_{max}$ and Equation 2, to project the idealized integrated PPF for the remainder of the day. If integrated PPF (from all sources) since sunrise, plus the idealized integrated solar PPF projected for the remainder of the day, exceed the PPF daily target, deploy the shade immediately. Otherwise, leave it retracted (or retract it if already deployed).

2. Starting two hours after sunrise, and continuing until one hour before sunset, use the integral of (unshaded) solar PPF since sunrise. Using the integral and Equation 2, calculate the value of $PPF_{max}$ that would have produced the same integral to the current hour. Then, again using Equation 2 (for t=SS), project the idealized integrated PPF expected for the remainder of the day. If integrated PPF (from all sources) since sunrise, plus the idealized integrated solar PPF projected for the remainder of the day, exceed the PPF daily target, deploy the shade immediately. Otherwise, leave it retracted (or retract it if already deployed).

Each of the above rules is, essentially, a means to extrapolate the integrated PPF received during daylight hours to an eventual value at sunset. Application of each rule is delayed until two hours after sunrise to ensure at least some solar PPF has been accumulated so extrapolation can be made with some degree of confidence. The two hour delay was determined to work adequately after examining the effects of delays of various lengths, from one to four hours. Obviously, if the morning hours are dark, but the day then becomes brighter, the second rule will respond slowly while the first rule will respond immediately.

To implement the two rules, the algorithm first proceeds to steps 204, 206, 208 and 210 where the PPF for the next time interval is accumulated; the accumulated PPF by the end of the day based on the PPF accumulated for the past time interval is projected; the PPF accumulated since sunrise is calculated; and, the accumulated PPF by the end of the day is projected based on that accumulated since sunrise. With this information, the algorithm next proceeds to step 212 where it is determined whether the daily PPF target value will be exceeded based on the projection from the past interval's PPF data if the shades 22 are not closed now. If so, the algorithm proceeds to step 214 and causes the shade control system 20 to close the shade 22 if it is not already closed. The algorithm then proceeds at step 216 to start the next shade loop, and thus returns to step 202.

If the answer to the inquiry at step 212 is no, the algorithm proceeds to step 218 to inquire whether the daily PPF target value will be exceeded based on the calculated projection of data since sunrise if the shade 22 is not closed now. If so, the algorithm proceeds once again to steps 214 and 216 to cause closure of the shade 22, and a return to the next shade loop. If the answer to the inquiry at step 218 is no, the algorithm proceeds to step 220 to cause the shade control system 20 to open the shade 22 if it is not already open, and the next shade loop is initiated.

Experiments on the Lighting Control Algorithm

Experiments were conducted to test the lighting and shade control algorithms. For the lighting control algorithm, its response to one year of hourly weather data was determined in a greenhouse climate simulation program. The focus of this test was on climates similar to that in the northeastern United States, characterized by relatively cloudy winters, but relatively sunny summers. Ithaca, N.Y. is located in central New York state, leeward (winter prevailing winds) of two of the Great Lakes, and experiences some of the cloudiest winter weather in the United States. After testing the algorithm in detail against a single year (1988) of weather data (and selecting parameters suitable for the one year), it was tested for generality against 8 additional years of hourly weather data for Ithaca, and 1 year of data from southern New Jersey. Southern New Jersey weather is sunnier during the winter and subject to less extreme swings of solar climate during the summer.

A representative greenhouse was assumed for the program. A maximum transmittance (solar noon at the summer solstice) of 0.7 was chosen to represent a typical glass house. Solar transmittance was assumed to vary over the day and year (lower at more oblique sun angles). A daily transmittance factor was assumed to vary as one-half a sine wave, rising from 0.6 at sunrise to 1.0 at solar noon, and returning to 0.6 at sunset. The yearly variation was assumed to vary as a full sine wave, varying from 0.8 on the winter solstice to 1.0 on the summer solstice. These variations were assumed for illustrative purposes only. Daily and yearly transmittance factors were applied by multiplication.

The rules of the algorithm are based on months and include four time delay intervals, H1, H2, H3 and H4. The values and associated months were: H1=12 hours (May, June and July), H2=9 hours (august), H3=7 hours (March, April and September) and H4=2 hours (all other months). Additionally, Rule 4 was applied for March through September, months with days longer than nights. These selection of months, and delay times, are not suggested as universal and their importance is discussed later.

Layout of Luminaires. Although the present invention focusses on lighting control, luminaire layout must be considered in any lighting design. Minimally, the number and type of luminaires should be adequate to achieve, on average, the design PPF level. For this test, 400W HPS luminaires were assumed. The luminaire chosen for the test simulations provides an intermediate degree of light pattern focus to avoid creating "hot" spots of light but is one of the more (energy) efficient units. Luminaire layout designs were completed to provide supplemental PPF values for 100, 125, 150, 175 and 200 $\mu$mol-m$^{-2}$s$^{-1}$, a range that includes levels appropriate for greenhouse lighting to a daily integral without being so high that plants will be excessively heated by infrared emissions from the lamps.

Weather Data. Actual data was preferred to test the algorithm rather than typical averaged data, even if available on an hourly basis, to impose the frequent wide day-to-day swings of solar insolation that a greenhouse actually experiences. One year of Ithaca weather data was considered as the rules for the supplemental lighting control algorithm were developed. Rules and parameters developed from this 1 year of data were then applied to 8 additional years of Ithaca weather data and 1 year of data from southern New Jersey, climates at somewhat the extremes of solar availability within the northeastern United States. These 9 additional years of weather data provided an important test of whether the rules were generally effective or were tailored only to the single year from which they were developed.

Results

Effect of Lighting Intensity. The test results established that supplemental lighting which provides low PPF intensities can not be expected to provide consistent daily PPF integrals of 17 mol-m$^{-2}$, regardless of the control imposed, during the darkest days. The 24 hour integral value determines the limits. The two higher intensity (175 and 200) designs could be expected to achieve the daily target in Ithaca on virtually all days, if control is adequate, while the 150 design should work on all but the darkest days. The lowest intensity (100 and 125) designs are inadequate except for the brightest winter days in highly transmissive greenhouses. The designs will become less adequate if the daily target is higher than 17 mol-m$^{-2}$ and, should the target be significantly lower, the higher numbered designs will work for more days. To retain focus on lighting for hydroponic lettuce production and for illustrative purposes, only 17 mol-m$^{-2}$ were considered during the tests.

Achieving Daily PPF Integrals. For a greenhouse transmittance as assumed, the Ithaca-like weather data, a PPF intensity greater than 150 $\mu$mol-m$^{-2}$s$^{-1}$ is required to approach the daily target of 17 mol-m$^{-2}$ closely for most months of the year, and an intensity nearer 200 is required if the target must be obtained every month. For New Jersey, the thresholds are lowered by approximately 25 $\mu$mol-m$^{-2}$s$^{-1}$.

The degree of control was found to improve as the PPF level increases until, at 200 $\mu$mol-m$^{-2}$s$^{-1}$, lighting to the target PPF integral is achieved for all winter days (October through February), regardless of ambient conditions. Lighting control is based on sunrise-to-sunrise PPF integrals. Monthly averages are determined from midnight-to-midnight integrals. Whether the first and last days of the month are bright or dark can introduce slight differences between the calculations.

Analysis

Several points can be deduced from the test results. First, during the dark time of the year (October through February), control to achieve the target PPF integral is excellent at the highest design PPF. The target is achieved on even the darkest days because supplemental lighting is enabled two hours after sunrise and no dark period is imposed for photoperiod reasons. During the rest of the year, however, days occur (even during the middle of summer) when the PPF target integral is not achieved even though lights are enabled at solar noon on days when the accumulated PPF is less than one-quarter the daily target at that time. There is insufficient capacity in any of the lighting systems considered here to achieve the target PPF integral on a very dark day if lighting can not begin until solar noon. However, this restriction was imposed because earlier enabling times wasted lighting on dark mornings followed by bright afternoons, but the lights had already been activated.

FIG. 5 is a table containing data to quantify the performance of the five potential lighting designs. Several observations arise from the data. First, the designs with higher PPF provide not only better control, they also waste fewer lighting hours (and, thereby, less electricity). Higher PPF designs permit two desirable actions: (1) more lighting PPF can be delayed to the off-peak period and (2) decisions can be delayed until later in the day, when more data has been accumulated and the solar day is more accurately characterized. The second action permits more intelligent decisions regarding whether to use the lights.

Because values of parameters and time delays were chosen to provide best control in response to the 1988 Ithaca weather data set, and assumed greenhouse conditions, the next step was to apply the same rules and parameter values to other sets of weather data and explore their wider applicability.

The results suggest Rules 2–5 and 8 improve control. When Rule 2 is omitted, lights are on during early morning hours of many summer days, thereby wasting energy. When Rule 3 is omitted, many days with various quantities of wasted light are seen and, in addition, virtually every summer day has at least one hour of early morning supplemental lighting regardless of the solar isolation for the day. Omitting Rule 4 degrades control less seriously, for there are fewer hours of additional wasted lighting incurred. Omitting Rule 5 shows performance close to having all rules in place. Rules 6 and 7 do not improve control when included but are intended only to reduce lighting cost by postponing lighting to the off-peak electricity period, a factor not shown in the graphs. Finally, omitting rule 8 leads to many days where the PPF integral target is missed by a small amount.

As a general comment, it was surprising how relatively well the supplemental lighting control algorithm controlled PPF integral lighting to meet a daily target, considering that the algorithm contains no historical data base to draw from and receives no advance notice of the weather expected for the day. Additionally, although differences are found between responses to the weather data of Ithaca and southern New Jersey, the differences are not great. Because these two weather data sets represent extremes of weather types (solar data) expected in the northeastern U.S., one can hope that a simple algorithm, such as presented here, may apply to a fairly wide geographic area.

The algorithm was tested by writing an output file to show the lighting system state for every hour of the year. Fortunately, the file showed no instances where supplemental lighting cycled repeatedly during a day. If lights remained on for part of the morning and then were turned off, they remained off until late afternoon or evening, and then were turned on until the PPF integral was obtained.

The several parameters of the control algorithm (e.g., H1, H2, H3 and H4) are fixed in the current algorithm. Adding adaptive control to the algorithm might be useful. Perhaps the parameters would be more usefully expressed as continuous functions of the time of year, with the parameters contained within the functions continually tuned as the algorithm operates. Additional simulations showed that an accurate measure of greenhouse transmittance at solar noon on the summer solstice (assumed to be the maximum potential for light transmission) is important for achieving good supplemental lighting control. For example, when the maximum transmittance was assumed to be 0.6 instead of 0.7, and all other factors remained constant, best control was achieved when H3 applied only to September, and not to March and April in addition. The magnitude of improvement was not great, but the energy cost of this change is estimated to be more than $5000 per acre-year of lighting to the daily target of 17 mol-m$^{-2}$. This suggests careful and ongoing monitoring of the control performance would be useful, and a careful assessment of maximum greenhouse transmittance be accomplished prior to implementing supplemental lighting control.

Experiments on the Shade Control Algorithm

The shade control algorithm was tested using the same greenhouse and weather data that was employed to test the supplemental lighting control algorithm. The results of this test are discussed below.

Early Morning Haze Factor. During development of the rules for the shade control algorithm, it was observed that the rules often were triggered somewhat too late, with the result being a consistent overshoot of the daily PPF target integral during the summer. Part of the reason was that mornings (at least for Ithaca weather data) tended to be slightly darker than afternoons. This was attributed to early morning haze, which fades during mid-morning as air warms and relative humidity drops. Part may also have been the presence of early morning dew and condensation on the greenhouse glazing. To accommodate the effects, a haze factor was hypothesized and used to divide the PPF integral extrapolated from the current house to sunset, as follows:

$$PPF_{rest\ of\ day} = (1/f_{haze})(PPF_{SR-SS} - PPF_{SR-1}) \quad (4)$$

where Equation 2 is used to calculate $PPF_{SR-SS}$ and $PPF_{SR-hr}$, based on an estimate of $PPF_{max}$ also determined using Equation 1 or 2, depending on the rule under consideration. A linear haze factor was assumed, rising from 0.5 at sunrise to 1.0 at solar noon and remaining at 1.0 until sunset.

Results

Achieving Daily PPF Integrals. 1988 Ithaca Weather Data. Data to characterize the daily PPF integrals, using both shade control rules, are in the table of FIG. 6 for Ithaca, 1988, weather data. Data for controlling lights, but not movable shades, is included for comparison. As can be seen from the values in FIG. 6, and accompanying graphs, the movable shade control algorithm provides relatively stable values of daily PPF integrals. Shade control during the brighter months of the year is not as steady as is supplemental light control during the darker months of the year. Shade control ends at sunset, whereas supplemental lights can continue to operate until the following dawn, should a PPF deficit exist at sunset. Interpreted another way, if a wrong decision is made with shade control at some hour of the day (if, for example, the day becomes suddenly much brighter), there is no way for the shade system to compensate.

Triggering the Rules. Data illustrated in the table of FIG. 7 show the frequency with which the two shade rules were triggered for each year of weather data. In contrast to what is observed for supplemental lighting control, the shading rules do not interact, although they usually overlap. Control based on the hourly PPF integral (Rule 1) is triggered more often than control based on the integrated PPF for the day (Rule 2). This raised the question of whether both rules are necessary.

The test weather data set (Ithaca for 1988) was used to contrast the effectiveness of implementing Rule 1 alone, then Rule 2 alone, compared to implementing both. Rule 2 alone does not achieve control as effectively as when both rules are active. This is apparently due to the slow response of the rule if a day grows brighter than the morning hours predict. In contrast, careful examination is required to find any difference between control based on Rule 1 alone, and on both rules. Using both rules does not degrade control effectiveness but, if simplicity is a goal, Rule 2 may be omitted.

Analysis

Achieving Daily PPF Integrals. Considering the simplicity of the rules contained in the proposed algorithm, control effectiveness is good. Simplicity was a goal of this work and movable shade control based on the first of the two simple rules was found to suffice and be as good as control based on both simple rules. Combined with supplemental lighting control, the averaged yearly deviation from the PPF target is estimated to be 0.1 mol-m$^{-2}$-day$^{-1}$, or an error of less than one percent. Most of this deviation occurs during the summer, suggesting slight refinements of the algorithm could reduce the slight errors. Whether this is important will depend on the penalty imposed by the summer PPF excess, which was estimated to be not more than 25% above the target for the sunniest single day of the summer and, on average, not more than 5% above the target for the sunniest months (based on the Ithaca, 1988, weather data).

Triggering the Rules. The test results indicate that numerous days have slight differences between using both rules, and using only Rule 1. Only two days showed significant differences (more than 0.1 mol-m$^{-2}$). Both days were characterized by solar histories that were very symmetric during the day. That is, the skies were very clear from sunrise until sunset. Days with less significant differences showed the same characteristic.

Rule 2 can be anticipated to contribute useful information on very clear days, for the integral uses all PPF received up to the hour under consideration and the algorithm attributes it to that hour, as it should. In contrast, Rule 1 averages the PPF received during the previous hour but the algorithm considers it to be the PPF at the current hour. The average is, thereby, always a half an hour behind the current flux, approximately. During the mornings of clear days, this half hour error can lead to deploying the shades too late, causing slight PPF excesses for the day. Decisions made more frequently than hourly would reduce, although not eliminate, this problem. Whether these slight errors truly matter is open to question, of course.

Improving Application of the Rules. Several options are worth exploring to modify the algorithm. One is to use a daily carryover of integrated PPF to adjust the following day's target. The carryover could be from only one day to the next, or could be spread over several following days. Research has suggested lettuce is able to integrate its response to its light environment over three days and, thus, a long-term integral may not be best. As an option, a "carry over" amount could be introduced into the integration of PPF history to place major emphasis on the most recent two or three days. For example, a carry over factor equal to the deficit or excess of the previous day could be added to the nominal PPF integral target for the current day to create an adjusted target. Preliminary simulations including a carry over from one day to the next were able to achieve a yearly average PPF integral exactly equal tot he nominal target, but day-to-day swings were wider. The question yet to be resolved is whether achieving the average exactly at the expense of greater daily variations is preferable to achieving smaller daily variations at the expense of missing the daily target, on the average, by a few percent.

Another option is to reduce the nominal summer PPF target by an amount estimated to provide an average closer to the desired PPF integral target. For example, reducing the daily target by 0.5 mol·m$^{-2}$ from May through August is suggested to improve control effectiveness. More carefully tailored reductions for each month, based on evidence from only one year of simulated results, are not likely to be desirable. Cursory examination of the other 8 years of simulated results for Ithaca suggested the value of 0.5 to be a reasonable estimate.

The results suggest supplemental lighting control should be modified when movable shades are installed. The modification would be for months during which the H3 lighting delay is imposed. For the simulation, lighting was withheld for 5 hours following sunrise during the months of March, April and September. This permitted slight excesses of light during bright days to compensate for slight deficits on dark days, when only supplemental lights are used. However, when movable shade is used there are few, if any, days of excess PPF during March, the first half of April, and the second half of September (at least for the 1988 data).

Imposing the 5-hour lighting delay for only the second half of April, and the first half of September, brings the average daily integrated PPF for those months, and March, closer to the target of 17 mol·m$^{-2}$. However, improvement has a price, for electricity use increased by a few percent and a few additional lighting hours were wasted. The target PPF was more closely approached during April and September, thus slightly more electricity was needed for those months. Additionally, tighter control can cause the shades to be deployed prematurely, leading occasionally to needing supplemental lights for a short period during the subsequent night to compensate for a PPF deficit.

During the test year, 60 days were more than 1 mol·m$^{-2}$ removed from the target PPF integral; 7 days were more than 2 mol·m$^{-2}$ in error; and 281 days received 17.00 mol·m$^{-2}$ of integrated PPF, achieving the target exactly. For this test year, 316 (7 out of 8) days were controlled to within 10% of the daily PPF integral target.

These refinements have been tailored specifically for weather data in Ithaca, N.Y., and are not suggested as universal. However, they show the types of small changes that can be made in the control algorithm to optimize control for other locations. The specificity of the refinements suggest that, if supplemental light and movable shade control are implemented, continued monitoring of the control system performance would be useful to discern areas for improvement. This could be a function of management, the supplier of the computer control program or, perhaps, implemented using a learning algorithm within the control program.

Interactions of Supplemental Lighting and Movable Shade Control. A comparison of data shows how adding shade control increases the annual supplemental PPF addition by 30 mol·m$^{-2}$. Further data show the refined algorithm increased electricity for lighting by an additional 4% over the year. These increases can be attributed to at least two factors. One factor arises when shade is deployed too soon and the day suddenly becomes darker, whereupon the lights must be used later that night to compensate the deficit. The increase due to the refined algorithm suggests this was the major contributor to the increases. Another reason arises due to the 1-hour time step used in the simulations. Decisions to deploy the shade were made hourly and, if calculations predicted the daily target would be exceeded if shade deployment were delayed until the next hour, regardless of how small the excess might be, the shade was deployed. This led to missing the PPF integral target by small amounts, deficits that were then erased by the supplemental lights operating for part of an hour later during the night. Although the need for electricity was not greatly increased, most of the increase could probably have been avoided if shade deployment decisions had been made more frequently than hourly and if meeting the PPF target exactly had not been strictly applied. However, weather data were not available in shorter time increments.

A control program would be able to cycle more frequently, although sufficient time would elapse between decisions so the PPF integrated over that time interval is not highly variable (as during a partly cloudy day). As a point of reference, for the Ithaca, 1988, weather data, the simulation predicted 11 days when the shades were deployed 3 times during the day, 45 days when shades were deployed twice, and 99 days when they were deployed once. This amounted to 222 deployments spread over 155 days. Interestingly, 8 of the 11 days with 3 deployments occurred between early April and the end of the first week in June, times of somewhat less consistent weather in Ithaca.

Summary

In summary, A set of 8 rules is proposed for greenhouse lighting control and these rules are shown to provide a consistent daily PPF integral during all months of the year. The success of the proposed algorithm shows daily PPF integral control is achievable without needing historical weather data, or a prediction of each day's solar conditions at the beginning of the day. However, the rules should be tailored to specific conditions of greenhouse transmittance and, perhaps, other factors. The results also show the importance of appropriate lighting system design to achieve a PPF intensity that will permit the daily PPF integral to be achieved on even the darkest days.

A simple, one rule algorithm is shown to provide good control of movable shade systems for greenhouses. Two rules were implemented in the simulations that formed the basis of this work but close examination showed one of the rules could be omitted. The retained rule uses PPF integrated during only the previous hour to project the integrated PPF expected by sunset and, if the total exceeds the daily target, the movable shade system is deployed. The movable shade algorithm, when combined with the supplemental light algorithm, controls the daily PPF integral within one percent of the desired target, on the average, during a year, and within three percent during the sunniest month.

Effectiveness of the simple algorithm can be improved using refinements based on temporal characteristics of the local solar climate. Such refinements require either simulations prior to control system installation (if suitable weather data is available), or continued observation of control effectiveness to identify months when control can be improved. Simulations require access to at least 1 year of weather data for the location, and preferably, more. Whether such refinements are necessary will depend on the ability of the crop in question to adapt to occasional days when the daily integrated PPF is above or below the daily target by 10 or 20%. As control effectiveness is improved, the electricity needed for lighting increases slightly. Thus, benefits of improved control must be balanced against added costs.

Although the invention has been disclosed in terms of a preferred embodiment and variations thereof, it will be understood that numerous other variations and modifications could be made thereto without departing from the scope of the invention as defined in the following claims.

What is claimed is:

1. A method for controlling greenhouse light through selective actuation of a supplemental lighting system disposed in a greenhouse, said supplemental lighting system comprising at least one electric lamp which can be turned on to increase the photosynthetic photon flux (PPF) to which an interior of said greenhouse is exposed, said method comprising the steps of:

a) periodically calculating at a plurality of time intervals a desired total target value of the accumulated PPF to which said interior of said greenhouse is to be exposed during said intervals;
   b) periodically determining at said plurality of time intervals the total amount of accumulated PPF to which said interior of said greenhouse is exposed;
   c) comparing said target value of PPF to said determined amount of PPF for each said time interval; and
   d) if said determined amount of PPF exceeds said target value of PPF for any of said time intervals, then turning off said supplemental lighting system at least until the next time interval if it is not already off.

2. The method of claim 1, further comprising the steps of:
   e) providing a time period during which said supplemental lighting system should be turned off;
   f) if the current time is during said time period, regardless of whether the determined amount of PPF exceeds said target value of PPF during said time period, then turning off said supplemental lighting system at least until the next time interval if it is not already off.

3. The method of claim 1, further comprising the steps of:
   e) determining if the current time interval is during the time of year with average daily solar insolation greater than or equal to a predetermined value, and if so;
   f) setting a lighting start delay interval appropriate to said greenhouse's climate and the month of the year; and
   g) if the current time is within said set delay interval, then turning off said supplemental lighting system at least until the next time interval if it is not already off.

4. The method of claim 1, further comprising the steps of:
   e) determining if the current time interval is both during the time of year during which the average solar insolation is greater than or equal to a predetermined value, and is between sunrise and sunset;
   f) if said target value of PPF exceeds said determined amount of PPF for the current time interval, determining if the difference between the target value and the determined amount could be achieved by actuating said supplemental lighting system at the next time interval, regardless of the amount of PPF accumulated from solar insolation;
   g) determining if the difference between the target value of PPF and the determined amount of PPF could be made up by a scaled portion of the total amount of PPF that can be generated by said supplemental lighting system during off-peak electricity rate hours; and
   h) if the determinations in steps e), f) and g) are all affirmative, then turning off said supplemental lighting system at least until the next time interval if it is not already off.

5. The method of claim 1, further comprising the steps of:
   e) determining if the current time interval is between sunrise and sunset;
   f) if said target value of PPF exceeds said determined amount of PPF for the current time interval, determining if the difference between the target value and the determined amount could be achieved by actuating said supplemental lighting system at the next time interval, regardless of the amount of PPF accumulated from solar insolation; and
   g) if the determinations in steps e) and f) are both affirmative, then turning off said supplemental lighting system at least until the next time interval if it is not already off.

6. The method of claim 1, further comprising the steps of:
   e) if the current time interval is not during off-peak electricity rate hours and the difference between the target value of PPF and the determined amount of PPF during the current time interval could be made up by actuating said supplemental lighting control system only during off-peak electricity rate hours, then turning off said supplemental lighting system at least until the next time interval if it is not already off.

7. The method of claim 1, further comprising the steps of:
   e) determining if the current time interval is between sunset and the start of off-peak electricity rate hours;
   f) determining if the difference between said target value of PPF and the determined amount of PPF during the current time interval could be made up during off-peak electricity rate hours alone; and
   g) if the determinations in steps e) and f) are both affirmative, then turning off said supplemental lighting system at least until the next time interval if it is not already off.

8. The method of claim 1, further comprising the steps of:
   e) if a decision has been made to turn off said supplemental lighting system but the current time interval is during the time of the year with average daily solar insolation less than a predetermined value, then determining if the difference between the target value of PPF and the determined amount of PPF during the current time interval cannot be provided by actuating said supplemental lighting system at the next time interval, and if so,
   f) negating said decision to turn off said supplemental lighting system.

9. The method of claim 3, further comprising the steps of:
   h) if a decision has been made to turn off said supplemental lighting system but the current time interval is during the time of the year with average daily solar insolation less than said predetermined value, then determining if the difference between the target value of PPF and the determined amount of PPF during the current time interval cannot be provided by actuating said supplemental lighting system at the next time interval, and if so,
   i) negating said decision to turn off said supplemental lighting system.

10. The method of claim 4, further comprising the steps of:
    i) if a decision has been made to turn off said supplemental lighting system but the current time interval is during the time of the year with average daily solar insolation less than said predetermined value, then determining if the difference between the target value of PPF and the determined amount of PPF during the current time interval cannot be provided by actuating said supplemental lighting system at the next time interval, and if so, j) negating said decision to turn off said supplemental lighting system.

11. The method of claim 5, further comprising the steps of:
   h) if a decision has been made to turn off said supplemental lighting system but the current time interval is during the time of the year with average daily solar insolation less than a predetermined value, then determining if the difference between the target value of PPF and the determined amount of PPF during the current time interval cannot be provided by actuating said supplemental lighting system at the next time interval, and if so,
   i) negating said decision to turn off said supplemental lighting system.

12. The method of claim 6, further comprising the steps of:
   f) if a decision has been made to turn off said supplemental lighting system but the current time interval is during the time of the year with average daily solar insolation less than a predetermined value, then determining if the difference between the target value of PPF and the determined amount of PPF during the current time interval cannot be provided by actuating said supplemental lighting system at the next time interval, and if so,
   g) negating said decision to turn off said supplemental lighting system.

13. The method of claim 7, further comprising the steps of:
   h) if a decision has been made to turn off said supplemental lighting system but the current time interval is during the time of the year with average daily solar insolation less than a predetermined value, then determining if the difference between the target value of PPF and the determined amount of PPF during the current time interval cannot be provided by actuating said supplemental lighting system at the next time interval, and if so,
   i) negating said decision to turn off said supplemental lighting system.

14. The method of claim 1, further comprising the steps of:
   e) forming a projected value of the total PPF to be accumulated by the end of the current day based on the amount of PPF accumulated for the past time interval;
   f) calculating a target value of PPF to be accumulated for the current day;
   g) determining if said projected value of PPF to be accumulated by the end of the day exceeds said target value of PPF for the day, and if so,
   h) causing a shade in said greenhouse to close if it is not already closed.

15. The method of claim 14, further comprising the steps of:
   i) forming a second projected value of PPF to be accumulated by the end of the day, said second projected value being based on the amount of PPF accumulated since sunrise;
   j) determining if said second projected value exceeds said target value, and if so;
   k) causing said shade to close if it is not already closed.

16. A method for controlling greenhouse light through selective actuation of a supplemental lighting system disposed in a greenhouse, said supplemental lighting system comprising at least one electric lamp which can be turned on to increase the photosynthetic photon flux (PPF) to which the greenhouse is exposed, said method comprising the steps of:
   a) periodically calculating at a plurality of time intervals a desired total target value of the accumulated PPF to which said greenhouse is to be exposed during said intervals;
   b) periodically determining at said plurality of time intervals the total amount of accumulated PPF to which an interior of said greenhouse is exposed;
   c) comparing said target value of PPF to said determined amount of PPF for each said time interval;
   d) if said determined amount of PPF exceeds said target value of PPF for any of said time intervals, then turning off said supplemental lighting system at least until the next time interval if it is not already off;
   e) determining if the current time interval is during the time of year with average daily solar insolation greater than or equal to a predetermined value, and if so;
   f) setting a lighting start delay interval appropriate to said greenhouse's climate and the month of the year;
   g) if the current time is within said set delay interval, then turning off said supplemental lighting system at least until the next time interval if it is not already off;
   h) determining if the current time interval is both during the time of year during which the average solar insolation is greater than or equal to said predetermined value, and is between sunrise and sunset;
   i) if said target value of PPF exceeds said determined amount of PPF for the current time interval, determining if the difference between the target value and the determined amount could be achieved by actuating said supplemental lighting system at the next time interval, regardless of the amount of PPF accumulated from solar insolation;
   j) determining if the difference between the target value of PPF and the determined amount of PPF could be made up by a scaled portion of the total amount of PPF that can be generated by said supplemental lighting system during off-peak electricity rate hours; and
   k) if the determinations in steps h), i) and j) are all affirmative, then turning off said supplemental lighting system at least until the next time interval if it is not already off.

17. The method of claim 16, further comprising the step of:
   l) if the current time interval is not during off-peak electricity rate hours and the difference between the target value of PPF and the determined amount of PPF during the current time interval could be made up by actuating said supplemental lighting control system only during off-peak electricity rate hours, then turning off said supplemental lighting system at least until the next time interval if it is not already off.

18. The method of claim 17, further comprising the steps of:
   m) determining if the current time interval is between sunset and the start of off-peak electricity rate hours;
   n) determining if the difference between said target value of PPF and the determined amount of PPF during the current time interval could be made up during off-peak electricity rate hours alone; and
   o) if the determinations in steps m) and n) are both affirmative, then turning off said supplemental lighting system at least until the next time interval if it is not already off.

19. The method of claim 18, further comprising the steps of:
  p) if a decision has been made to turn off said supplemental lighting system but the current time interval is during the time of the year with average daily solar insolation less than said predetermined value, then determining if the difference between the target value of PPF and the determined amount of PPF during the current time interval cannot be provided by actuating said supplemental lighting system at the next time interval, and if so,
  q) negating said decision to turn off said supplemental lighting system.

20. The method of claim 19, further comprising the steps of:
  r) providing a time period during which said supplemental lighting system should be turned off;
  s) if the current time is during said time period, regardless of whether the determined amount of PPF exceeds said target value of PPF during said time period, then turning off said supplemental lighting system at least until the next time interval if it is not already off.

21. The method of claim 20, further comprising the steps of:
  t) determining if the current time interval is both during the time of year during which the average solar insolation is greater than or equal to a predetermined value, and is between sunrise and sunset;
  u) if said target value of PPF exceeds said determined amount of PPF for the current time interval, determining if the difference between the target value and the determined amount could be achieved by actuating said supplemental lighting system at the next time interval, regardless of the amount of PPF accumulated from solar insolation;
  v) determining if the difference between the target value of PPF and the determined amount of PPF could be made up by a scaled portion of the total amount of PPF that can be generated by said supplemental lighting system during off-peak electricity rate hours; and
  w) if the determinations in steps t), u) and v) are all affirmative, then turning off said supplemental lighting system at least until the next time interval if it is not already off.

22. A method for controlling greenhouse light through selective actuation of a movable shade system which selectively opens and closes a shade in said greenhouse, said method comprising the steps of:
  a) calculating a desired daily target value of photosynthetic photon flux (PPF) to which an interior of said greenhouse is to be exposed;
  b) determining the total amount of PPF to which said interior of said greenhouse is exposed during a predetermined time interval;
  c) making a projection of the total PPF to be accumulated by the end of the day based on the amount of PPF accumulated for said time interval;
  d) if said projected accumulated PPF amount exceeds said target value, then closing said shade if it is not already closed.

23. The method of claim 22, further comprising the steps of:
  e) determining the total amount of PPF to which the interior of said greenhouse has been exposed since sunrise;
  f) making a second projection of the total PPF to be accumulated by the end of the day based on the PPF accumulated since sunrise; and
  g) if said second projected accumulated PPF amount exceeds said daily PPF target value, then closing said shade if it is not already closed.

24. The method of claim 22, further comprising the steps of:
  h) providing a supplemental lighting system in said greenhouse, said supplemental lighting system comprising at least one electric lamp which can be turned on to increase the PPF to which said greenhouse is exposed;
  i) periodically calculating at a plurality of time intervals a desired target value of PPF to which said interior of said greenhouse is to be exposed;
  j) periodically determining at said plurality of time intervals the amount of PPF to which said interior of said greenhouse is exposed;
  k) comparing said target value of PPF to said determined amount of PPF for each said time interval; and
  l) if said determined amount of PPF exceeds said target value of PPF for any of said time intervals, then turning off said supplemental lighting system at least until the next time interval if it is not already off.

25. A controller for selectively actuating a supplemental lighting system disposed in a greenhouse, and thereby controlling light in said greenhouse, said supplemental lighting system comprising at least one electric lamp which can be turned on to increase the photosynthetic photon flux (PPF) to which an interior of said greenhouse is exposed, said controller comprising means for:
  a) periodically calculating at a plurality of the accumulated time intervals a desired total target value of PPF to which an interior of said greenhouse is to be exposed during said intervals;
  b) periodically determining at said plurality of accumulated time intervals the total amount of PPF to which said interior of said greenhouse is exposed;
  c) comparing said target value of PPF to said determined amount of PPF for each said time interval; and
  d) turning off said supplemental lighting system at least until the next time interval if said determined amount of PPF exceeds said target value of PPF for any of said time intervals, and it is not already off.

26. The controller of claim 25, further including means for:
  e) providing a time period during which said supplemental lighting system should be turned off; and
  f) turning off said supplemental lighting system at least until the next time interval if it is not already off, and the current time is during said time period, regardless of whether the determined amount of PPF exceeds said target value of PPF during said time period.

27. The controller of claim 25, further including means for:
  e) determining if the current time interval is during the time of year with average daily solar insolation greater than or equal to a predetermined value, and if so;
  f) setting a lighting start delay interval appropriate to said greenhouse's climate and the month of the year, and
  g) turning off said supplemental lighting system at least until the next time interval if it is not already off, and the current time is within said set delay interval.

28. The controller of claim 25, further including means for:
   e) determining if the current time interval is both during the time of year during which the average solar insolation is greater than or equal to a predetermined value, and is between sunrise and sunset;
   f) if said target value of PPF exceeds said determined amount of PPF for the current time interval, determining if the difference between the target value and the determined amount could be achieved by actuating said supplemental lighting system at the next time interval, regardless of the amount of PPF accumulated from solar insolation,
   g) determining if the difference between the target value of PPF and the determined amount of PPF could be made up by a scaled portion of the total amount of PPF that can be generated by said supplemental lighting system during off-peak electricity rate hours; and
   h) turning off said supplemental lighting system at least until the next time interval if it is not already off, and the determinations in steps e), f) and g) are all affirmative.

29. The controller of claim 25, further including means for:
   e) determining if the current time interval is between sunrise and sunset;
   f) if said target value of PPF exceeds said determined amount of PPF for the current time interval, determining if the difference between the target value and the determined amount could be achieved by actuating said supplemental lighting system at the next time interval, regardless of the amount of PPF accumulated from solar insolation; and
   g) turning off said supplemental lighting system at least until the next time interval if it is not already off, and the determinations in steps e) and f) are both affirmative.

30. The controller of claim 25, further including means for turning off said supplemental lighting system at least until the next time interval if it is not already off, the current time interval is not during off-peak electricity rate hours, and the difference between the target value of PPF and the determined amount of PPF during the current time interval could be made up by actuating said supplemental lighting control system only during off-peak electricity rate hours.

31. The controller of claim 25, further including means for:
   e) determining if the current time interval is between sunset and the start of off-peak electricity rate hours;
   f) determining if the difference between said target value of PPF and the determined amount of PPF during the current time interval could be made up during off-peak electricity rate hours alone; and
   g) turning off said supplemental lighting system at least until the next time interval if it is not already off, and the determinations in steps e) and f) are both affirmative.

32. The controller of claim 25, further including shade actuation means for selectively opening and closing a movable shade disposed in said greenhouse, said shade actuation means further comprising means for:
   e) forming a projected value of the total PPF to be accumulated by the end of the current day based on the amount of PPF accumulated for the past time interval;
   f) calculating a target value of PPF to be accumulated for the current day;
   g) determining if said projected value of PPF to be accumulated by the end of the day exceeds said target value of PPF for the day, and if so,
   h) causing said shade to close if it is not already closed.

33. The controller of claim 32, wherein said shade actuation means further includes means for:
   i) forming a second projected value of PPF to be accumulated by the end of the day, said second projected value being based on the amount of PPF accumulated since sunrise;
   j) determining if said second projected value exceeds said target value, and if so;
   k) causing said shade to close if it is not already closed.

34. A controller for selectively opening and closing a movable shade disposed in a greenhouse to control light in said greenhouse, said controller including means for:
   a) calculating a desired daily target value of photosynthetic photon flux (PPF) to which an interior of said greenhouse is to be exposed;
   b) determining the total amount of PPF to which said interior of said greenhouse is exposed during a predetermined time interval;
   c) making a projection of the total PPF to be accumulated by the end of the day based on the amount of PPF accumulated for said time interval; and
   d) closing said shade if it is not already closed, and said projected accumulated PPF amount exceeds said target value.

35. The controller of claim 34, further including means for:
   e) determining the total amount of PPF to which the interior of said greenhouse has been exposed since sunrise;
   f) making a second projection of the total PPF to be accumulated by the end of the day based on the PPF accumulated since sunrise; and
   g) closing said shade if it is not already closed, and said second projected accumulated PPF amount exceeds said daily PPF target value.

36. The controller of claim 34, further including light actuation means for selectively actuating a supplemental lighting system disposed in said greenhouse, said supplemental lighting system comprising at least one electric lamp which can be turned on to increase the PPF to which said greenhouse is exposed, said light actuation means further comprising means for:
   a) periodically calculating at a plurality of time intervals a desired target value of PPF to which said interior of said greenhouse is to be exposed;
   b) periodically determining at said plurality of time intervals the amount of PPF to which said interior of said greenhouse is exposed;
   c) comparing said target value of PPF to said determined amount of PPF for each said time interval; and
   d) turning off said supplemental lighting system at least until the next time interval if it is not already off, and said determined amount of PPF exceeds said target value of PPF for any of said time intervals.

* * * * *